United States Patent [19]

Chopping et al.

[11] Patent Number: 5,172,376
[45] Date of Patent: Dec. 15, 1992

[54] SDH REJUSTIFICATION

[75] Inventors: Geoffrey Chopping, Dorset; Glyn Jones, London; Peter D. Kerr, Dorset, all of England

[73] Assignee: GPT Limited, England

[21] Appl. No.: 706,989

[22] Filed: May 29, 1991

[30] Foreign Application Priority Data

Jun. 4, 1990 [GB] United Kingdom ............... 9012436

[51] Int. Cl.$^5$ .............................................. H04J 3/06
[52] U.S. Cl. .................. 370/100.1; 370/102; 370/105; 370/105.1
[58] Field of Search ............ 370/61, 100.1, 102, 370/105, 105.1

[56] References Cited

U.S. PATENT DOCUMENTS

| 3,597,552 | 8/1971 | Goto ................................... 370/102 |
| 3,646,271 | 2/1972 | Shigaki .............................. 370/102 |
| 4,764,942 | 8/1988 | Shigaki et al. .................... 375/118 |
| 4,811,340 | 3/1989 | McEachern et al. .............. 370/102 |
| 5,113,395 | 5/1992 | Murakami et al. ................ 370/102 |

Primary Examiner—Douglas W. Olms
Assistant Examiner—Russell W. Blum
Attorney, Agent, or Firm—Kirschstein, Ottinger, Israel & Schiffmiller

[57] ABSTRACT

The invention concerns a method of pointer processing a digital TDM data stream at a node of a synchronous SDH transmission network so as to justify the data stream on transmission, the data stream having a specified line frequency and being composed of frames, each frame containing a reference word, and the node of the transmission network having a node frequency, the method comprising storing the incoming data stream in a buffer store at the node, using the line reference of the incoming data stream to extract a data pointer from the data stream for each frame, which data pointer indicates the location of the reference word of that frame in the buffer store, and characterized in that a timing pointer is extracted from the incoming data stream utilizing the line reference and a line clock the frequency of which is a multiple of the line reference; the timing pointer so extracted is converted into a reference value by utilizing the node reference and a node clock; the reference value is utilized to generate a node timing pointer; the node timing pointer is compared with a read address and data pointer; and read-out from the buffer store is justified in accordance with the results of the comparison.

4 Claims, 4 Drawing Sheets

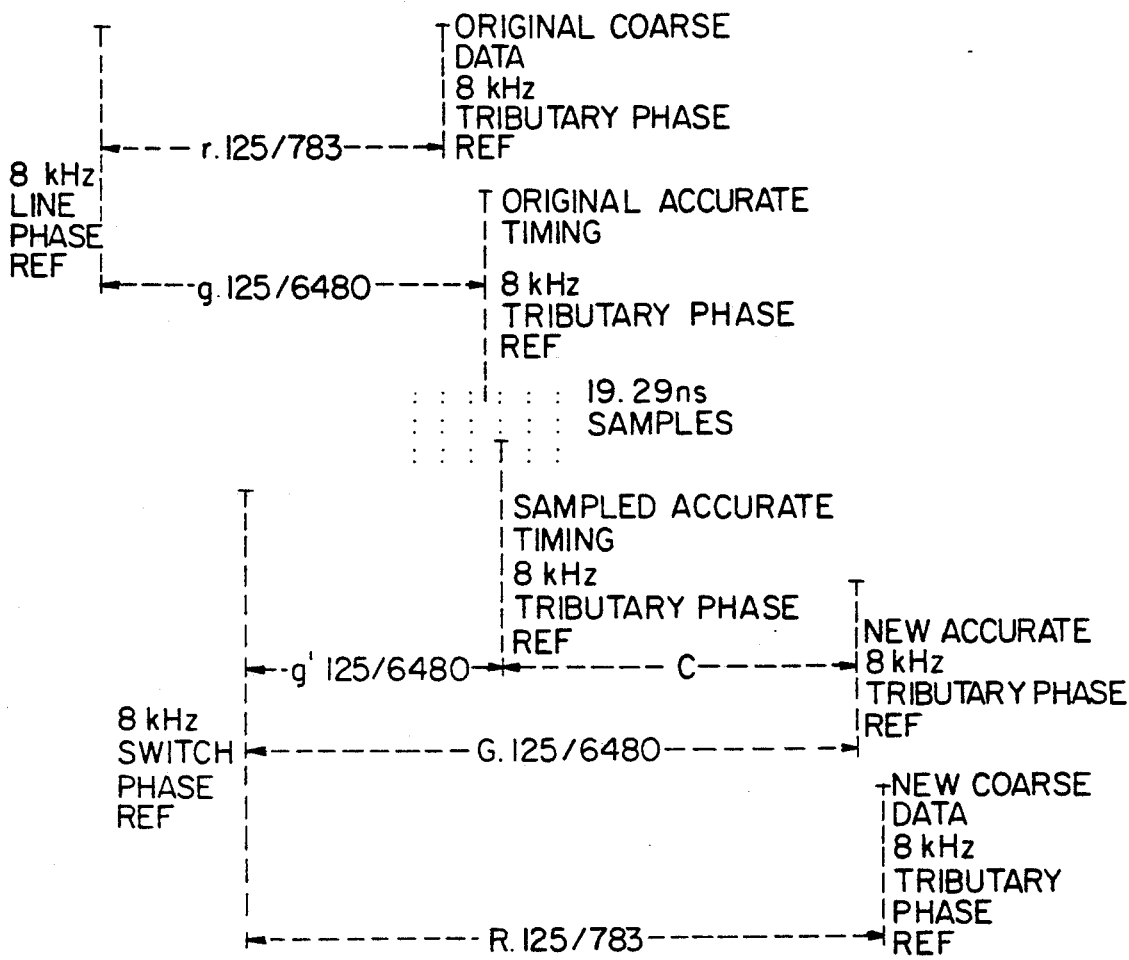

- r = VALUE OF ORIGINAL TRIBUTARY DATA POINTER RELATED TO 8kHz LINE PHASE REFERENCE
- g = VALUE OF ORIGINAL TRIBUTARY TIMING POINTER RELATED TO 8 kHz LINE PHASE REFERENCE
- g' = VALUE OF SAMPLED TRIBUTARY TIMING POINTER RELATED TO 8 kHz SWITCH PHASE REFERENCE
- G = VALUE OF NEW TRIBUTARY TIMING POINTER RELATED TO 8kHz SWITCH PHASE REFERENCE
- R = VALUE OF NEW TRIBUTARY DATA POINTER RELATED TO 8 kHz SWITCH PHASE REFERENCE
- C = VALUE OF CONSTANT REJUSTIFICATION DELAY

UNITS IN MICROSECONDS EXCEPT WHERE SHOWN

TIMING POINTER FORMATS

MF = MULTI FRAME

| "1" | "0" | BIT 12 | BIT 11 | BIT 10 | BIT 9 | BIT 8 | BIT 7 |

H3 MORE SIGNIFICANT BYTE

| "0" | BIT 6 | BIT 5 | BIT 4 | BIT 3 | BIT 2 | BIT 1 | BIT 0 |

H3 LESS SIGNIFICANT BYTE

SDH REJUSTIFICATION

BACKGROUND OF THE INVENTION

1. Field of the Invention

The present invention concerns the digital transmission of data and in particular data transmitted by what is known as SDH (Synchronous Digital Hierarchy).

2. Description of Related Art

Soon after the introduction of 24 and 30 channel PCM systems in the 1960's and early 1970's, time division multiplexing was used to combine the serial bit streams of four such systems into one bit stream for more economical transmission. This became known as second-order digital multiplexing. Subsequent developments have led to third, fourth and fifth-order multiplexers, as progressively more streams are combined. These have traditionally been used in a hierarchy to assemble telephony, data or other traffic to the highest bit rate possible for economic transmission.

At each level in the hierachy several bit streams, known as 'tributaries', are combined or separated by a multiplexer/demultiplexer called a 'muldex' (often abbreviated to 'mux'). The steps in the hierarchy were chosen to allow flexibility in traffic planning and an economic balance between muldex costs and transmission costs.

Since the mid-1980's there have been moves to define a new muldex hierarchy with larger steps and based on networks which are essentially synchronous. The bandwith properties of optical fibres have changed the balance between transmission and muldex costs, compared to the use of copper cables and radio, and lower overall costs can now be achieved by having larger step sizes. In addition, it is hoped that synchronous operation will provide simpler multiplexing to very high bit rates and lead to lower switching costs together with new switched services.

However SDH will necessarily have to operate in an environment which is not strictly synchronous. The concept of a true synchronous network relies on all connected parties using the same clock. In practice each regional operating authority will require to have control over the security of its own clock and so several 'master' clocks will exist, each of high stability, but with some slight drift possible between them. Not all inputs to multiplexers therefore will be truly synchronous. Thus data streams, normally consisting of multiplexed data streams, will, when reaching a network node or switch require justification to match the rate of the incoming data stream which has its own line frequency to that of the receiving node.

Another problem is that in a nominally synchronous network, the input to a multiplexer may suffer from wander because of slow changes in transmission path propagation delay; these changes can be caused by cable temperature shifts and by daily movement of geosynchronous satellites, for example.

Thus multiplexers will have to accept tributary inputs which are plesiochronous. Not only must the multiplexer perform bit interleaving on these inputs but it must also permit the reconstruction of the original tributary signals at the demultiplexers. Accordingly before the tributaries are interleaved they must be brought into true synchronism. This is achieved by "justification". Justification is used in this specification to mean the process of bringing the source frequency of a tributary into synchronism with the traffic or carrier frequency and involves first writing the input data for each tributary into a separate first-in-first-out buffer store (FIFO) using a clock derived from the tributary input and known as the source clock. Next data is read out from all the stores in parallel by a common read-out clock known as the carrier clock. In order to avoid store overflow the read-out or carrier clock is arranged to be faster than the fastest expected input clock. In order to avoid having the store emptied a pulse is occasionally removed from the read clock for each individual tributary so that no data bit is read out of the store. Instead a dummy bit is transmitted which will be removed by the multiplexer at the receive end of the transmission path. This is known as positive justification.

Negative justification is the converse of positive justification and is used when the read clock to the elastic stores is not fast enough always to prevent store overflow. Instead an extra data bit is occasionally removed from the store and transmitted in a spare time slot. Both positive and negative justification may be used in the same multiplexer and this combined process is called positive/zero/negative justification. Justification need not be limited to the insertion or removal of single bits. Instead it can be carried out in multi-bit steps. SDH is based on bytes (8 bits) and justification is accordingly carried out in 8 bit steps.

Positive/zero/negative justification is the justification technique which has been proposed for SDH. In SDH, when the network is synchronous or appears to be synchronous for a period, then no justification may appear for some considerable period. Figures of more than one second are possible as are figures of more than a whole day. The justification process is controlled by what is called a data pointer and the utilisation of the data pointer for this purpose is called pointer processing. When justification does occur 8 more bits or 8 less bits will be sent in a given period. The effect of this is that when a final 2084 kbit/s tributary output is generated which has had either positive or negative justification a phase jump of nearly 4 microseconds will occur. However the specification set by CCITT recommendation G.823 on jitter and wander, in section 3 Table 1, sets a low frequency limit on phases shift of 1.5 bit (732 ns) which will be exceeded. Accordingly users of the SDH network will treat the phase shift introduced by the justification as wander. Such a phase shift can be smoothed out under the CCITT recommendation but the minimum time would be in the order of 50 seconds, with sinusoidal transition. However it is insufficient to allow for the maximum number of 8 bit phase steps on an end to end traffic link to calculate wander requirements. The wander on the links from the network clock reference also have to be added on. If these links are also carried by SDH then 3 times the number of phase steps could be seen. This is because if the nodes at each end are moving their clocks about, because of the phase steps on the clock reference links, then even more phase steps may be forced onto the traffic link. This can cause more than 18 microseconds of wander which will mean that slips will start in the transmitted data causing data loss and degraded transmission.

A method for meeting this problem has been proposed which comprises forcing regular justification of a first polarity onto a carrier frequency, and then generating justification of the opposite polarity at the same rate as the said regular justification if there is no relative drift between the source and the carrier frequencies, and either to increasing or reducing the rate of generation of said justification of opposite polarity in response to drift between the source and carrier frequencies.

However another approach to the problem of rejustification may be preferable. This approach concentrates on the nature of the algorithm which is followed during the rejustification procedures.

3. Summary of the Invention

Accordingly the invention comprises a method of pointer processing a digital TDM data stream at a node of a synchronous SDH transmission network so as to justify the data stream on transmission, the data stream having a specified line frequency and being composed of frames, each frame containing a reference word, and the node of the transmission network having a node frequency, the method comprising storing the incoming data stream in a buffer store at the node, using the line phase reference of the incoming data stream to extract a data pointer from the data stream for each frame, which data pointer indicates the location of the reference word of that frame in the buffer store, and characterised in that a timing pointer is extracted from the incoming data stream utilising the line phase reference and a line clock the frequency of which is a multiple of the line phase reference; the timing pointer so extracted is converted into a phase reference value by utilising the node reference and a node clock; the reference value is utilised to generate a node timing pointer; the node timing pointer is compared with a read address and data pointer; and read-out from the buffer store is justified in accordance with the results of the comparison.

The invention also comprises apparatus for carrying out the aforesaid method.

Consequently changes in the data pointer value can occur without a change in the timing pointer value as well as changes in the timing pointer value occurring without changes in the data pointer value.

BRIEF DESCRIPTION OF THE DRAWINGS

In order that the present invention may be more readily understood an embodiment thereof will now be described by way of example and with reference to the accompanying drawings, in which:

FIG. 2 is a diagram showing timing references,
FIG. 3 shows timing pointer formats.

DETAILED DESCRIPTION OF THE PREFERRED EMBODIMENT

The best known European synchronous Muldex is that used to assemble 30 speech channels into a PCM (Pulse Code Modulation) signal at 2 Mbit/s. The frame structure is defined in CCITT recommendation G704. All of the channels use the same 2 Mbit/s clock for their encoding processes. The key features of the system include basic modules which are synchronous to each other. Each basic module has spaces left in the frame structure for later addition of transmission support services and for the addition of multiplexer overheads. The modules are based on a time period of 125 microseconds. This allows cross-connection down to 64 kbit/s if suitable frame stores are added.

As mentioned in the preamble of this specification problems arise in the SDH because of wander in the inputs to multiplexers. In a long chain of multiplexers and switches the total delay is likely to prove unacceptable unless action is taken.

Storage and delay are inherent in the operation of a digital switch but it is possible to minimise them in a synchronous muldex provided that the muldex has the ability to transmit details of the direction and extent of any wander or drift on its inputs. One proposed method of carrying this out is the Payload Pointer System. In this system "pointer" bytes are associated with the start of a multiplexer frame. These pointer bytes show where, within a frame, can be found the Reference Word (the frame alignment word or the beginning of a block of traffic within the frame). As the clock associated with the traffic drifts so the pointer changes value.

Figure 1:
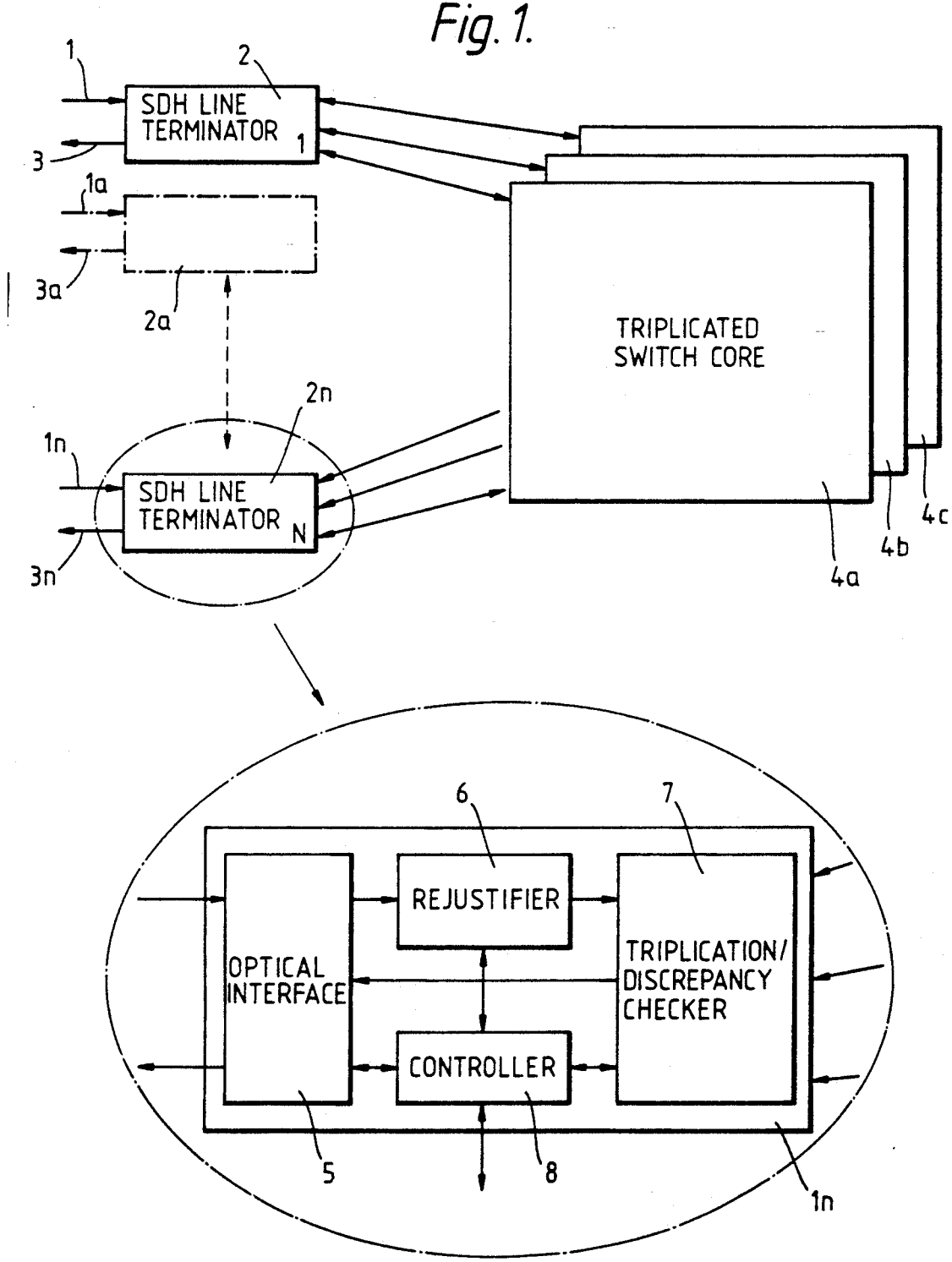
FIG. 1 shows a ISDN network node.

Referring now to FIG. 1 of the drawings this shows a part of a typical muldex. Incoming data lines are shown at 1, 1a . . . 1n which terminate at SDH line terminators 2, 2a . . . 2n respectively. There are corresponding outgoing data lines 3, 3a . . . 3n. Each of the terminators 2 . . . 2n is connected to a triplicated switch core 4a, 4b, 4c. As is apparent from the previous description each of the incoming lines will have a rate determined by its line phase reference which may be different from that of the switch although ideally the line and switch references should be identical. It will be appreciated that FIG. 1 is merely one example of a node in an SDH transmission network. In general terms each incoming data stream will have its line phase reference and a node will have a node phase reference.

Section A of FIG. 1 is an expanded diagram of SDH line terminator 2n and it will be appreciated that the other terminators are identical to it. In this figure the incoming and outgoing lines 1n, 3n are terminated by an optical interface 5, the incoming line is rejustified by a Rejustifer circuit 6 connected to a Triplication/Discrepancy Checker 7 connected to the three identical sections of the switch core 4a, 4b and 4c. The line terminator also includes a control circuit 8 controlled by a processor (not shown). Apart from the details of the Rejustifier Circuit 6, which will be described later, this arrangement is entirely conventional.

Referring now to FIG. 2 of the accompanying drawings, this shows the relationship between the known payload or data pointer and an additional pointer which is the subject of the present invention. This additional pointer is given the name timing pointer.

FIG. 2 of the drawings shows an 8 KHz Line Phase reference. This is the 8 kHz reference that is multiplied up to give the 155.52 MHz Line Clock and also the 19.44 MHz Line byte clock. It can be considered as occurring when the first byte, out of 270, of the first row out of nine of a frame arrives at the line interface. When an STM-1 is received from the line by the rejustifier the VC4 Original Coarse Tributary Data Pointer can be extracted from the SOH (Section Overheads) and validated. The Original Coarse Tributary Data Pointer related to the 8 kHz Line Phase Reference is a value, in FIG. 2 (r), from which the position of the Reference word in the frame can be calculated.

Once the validated Data Pointer has been extracted the value r of the pointer can be decremented every time a VC4 word is received as it is written into the buffer. The address to which each word is written is determined from the decremented value of the pointer. The Line Phase Reference has a period of 125 microseconds which is defined by the time between its successive 8 KHz reference markers. For a VC4 payload the Data pointer, as defined by the current SDH standard, has 783 possible values. Thus with a value of r the Original Coarse Data 8 KHz Tributary Phase Reference, as shown in FIG. 2, occurs r times 125/783 microseconds after the Line Phase Reference. The Original Coarse Data to 8 KHz Tributary Phase Reference occurs at approximately the time that the Reference word is received by the rejustifier from the line. The Reference Word is the first word, sometimes byte, of the VC4 that the Data Pointer refers to. Consequently the Reference Word can always be written to location zero of the buffer.

This is the only function of the Original Tributary Data Pointer related to the 8 kHz Line Phase Reference.

Extraction from the buffer follows a complementary process.

A Read Buffer Address counter (full range of 783) is used to address the buffer to extract words for the VC4 payload. As each word is extracted the counter is decremented.

At the time of the Switch Phase Reference, as shown in FIG. 2, the counter is read and this value (R) is used as the New Tributary Data Pointer, i.e. it indicates the location of the Reference word in the outgoing payload. The Switch Phase Reference Preference is the equivalent in the switch to the Line Preference, and it is dealing with possible phase drift between the Line Phase and Switch Phase Reference that this invention is concerned. The Switch Phase Reference is the 8 KHz reference which is multiplied up to give the 155.52 MHz Switch Output Bit Clock and the more usable 19.44 MHz Switch byte clock. The Switch Phase Reference can be considered as occurring when the first byte (out of 270) of the first row (out of 9) of the regenerated SDH stream leaves the rejustifier interface.

When the Read Buffer Address counter is at zero the Reference Word is read from the buffer. This ensures that the Write and Read Data Pointers are synchronised. The Reference Word is carried by three bytes of the 2430 bytes of the SDH format.

At about the time the Read Buffer Address counter reaches zero the corresponding Data Switch Phase Reference occurs. The Data Switch Phase Reference is the 8 kHz reference that occurs at approximately the time the Reference Byte leaves the rejustifier. For a VC4 payload the pointer, as defined by the current SDH standard, has 783 possible values. If the value of this New Tributary Data pointer is R then the Data Line Phase Reference occurs R X 125/783 microseconds after the Switch Phase Reference.

In accordance with the invention the Rejustification procedure also incorporates a further pointer. This is called a Timing Pointer. The Timing Pointer is derived from a Timing Line Reference. The Timing Line Reference is an 8 kHz reference that occurs at approximately the time that the Reference Byte is received by the rejustifier from the line.

It is intended that the timing pointer will be carried in the H3 byte for AU4, AU3 and TU3. The timing pointer will be carried in the V3 byte for TU2, TU12 and TU11. A Timing pointer is carried in 13 bits. Consequently two bytes will be needed to carry a pointer.

The H3 field has 24 bits for AU4, but all the other payload configurations use H3 and V3 fields which only have 8 bits. It will therefore require two successive H3 or V3 bytes to transport a complete timing pointer.

The H3 and V3 bytes are of course used during justification, but even at peak justification rates only 25% of the V3 bytes can be used for justification. In order to maintain a common format only the 8 bits in column 7 of the H3 field for AU4 will be used. The most significant bit of the H3 or V3 byte will be an indicator to say if the remaining bits form the lower significant 7 bits of the timing pointer, or the upper significant 6 bits.

For a VC4 payload the Timing Pointer, which is not defined by the current SDH standard, has 6480 possible values. If the value of this Original Accurate Timing Pointer is g then the Timing Tributary Phase Reference occurs (g x 125/6480) microseconds after the Timing Line Phase Reference. In a manner similar to the Data pointer the Timing pointer is defined by a value, in the present description g which is extracted from the SOH and validated.

Once the validated Timing Pointer has been extracted the value (g) of the pointer can be decremented every 19.29 ns until it reaches zero. The start of the decrement corresponds to the Line Reference. The time the decrement reaches zero corresponds to the Timing Line Reference.

Immediately the zero state is reached a "state change" is forced on the Timing Line Reference signal. This "state change" is sampled by a switch 51.84 MHz clock. Consequently a sampling error of up to 19.29 ns can result.

This "state change" is used to freeze the value (g') of a counter which starts counting from zero at the time of the Switch Reference. This now gives a Timing Line Reference related to the Switch Reference.

Because the aim of a Rejustifier must be to minimise phase distortion, it must aim to have a constant delay between the Timing Line Phase Reference and the Timing Switch Reference. This delay must be sufficient to more than cover the effects of the SDH format jitter. Therefore a New Accurate Timing 8 KHz Tributary Phase Reference can be generated which is a constant (C) number of 19.29 ns later than the Timing Line Reference. The Timing Switch Pointer (G) is generated by adding C to the frozen value (g') on the counter.

The New Timing 8 KHz Tributary Phase Reference has therefore been derived from the Timing Line Reference with a maximum of +19.29 ns of phase distortion caused by the sampling error.

The regenerated Timing Switch Pointer can then be continually re-inserted into the outgoing VC4 H3 byte.

FIG. 3 of the drawings shows typical timing pointer formats.

Figure 4:
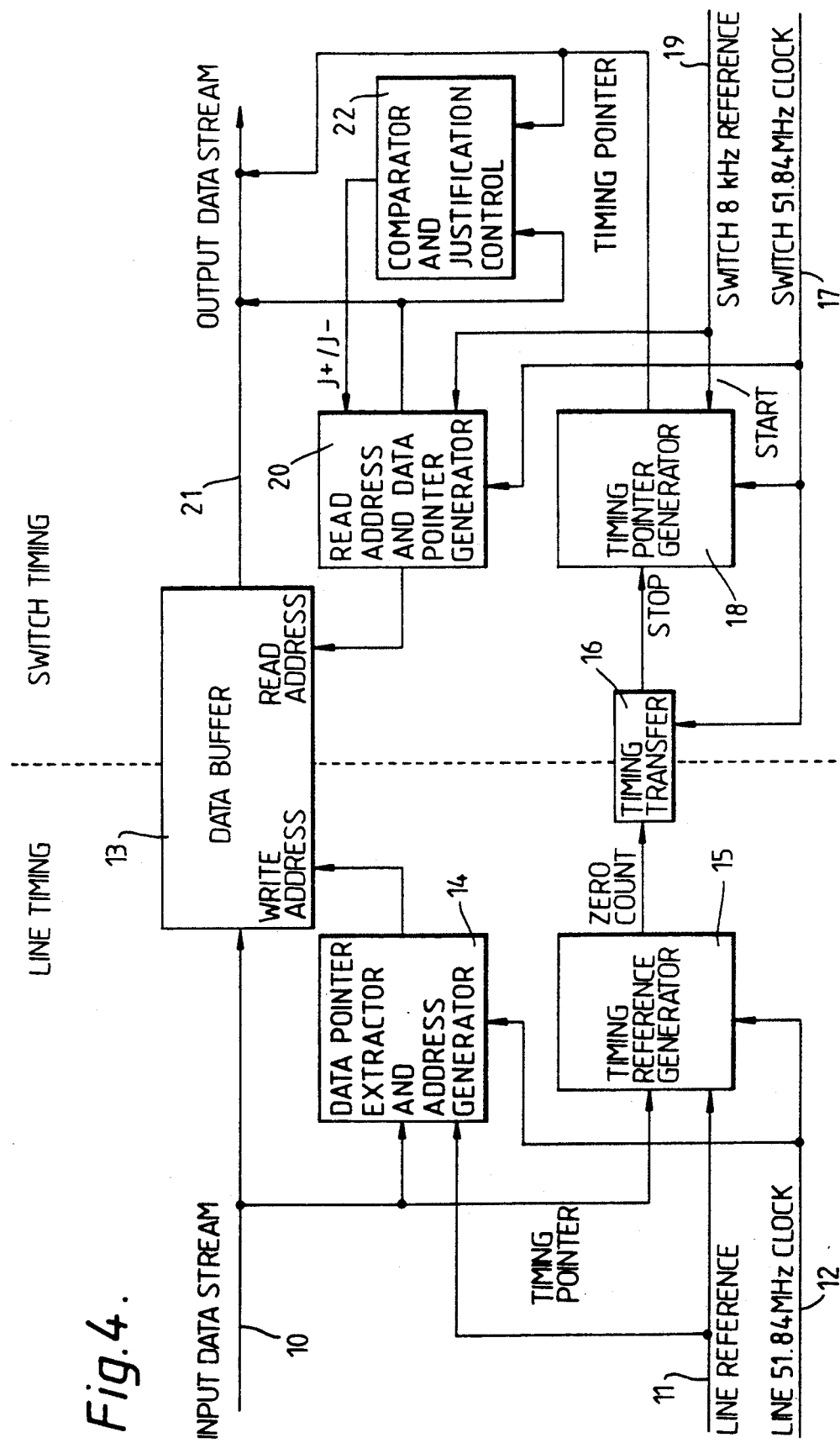
FIG. 4 is a block diagram of rejustification circuitry according to the present invention.

Referring now to FIG. 4 of the drawings this is a block diagram showing an embodiment of utilising the Data and Timing pointers just described and corresponding to Justifier Circuit 6 of FIG. 1.

In this Figure the input data stream is shown at 10 along with the Line Phase Reference at 11 and 51.84 MHz Clock at 12. The input data stream is written into a data buffer 13, whilst the Data Pointer is extracted in a Data Pointer Extractor circuit 14 under the control of the Line Phase Reference 11 and Line Clock 12. The Timing Pointer is supplied to a Timing Reference Generator 15 to which the Line Phase Reference 11 and Line Clock 12 are also fed. The output of Timing Reference Generator 15 is supplied to a Timing Transfer circuit 16 connected the 51.84 MHz Switch Clock 17.

The output from the Timing Transfer circuit 16 is connected to a Timing Pointer generator 18 which is supplied with the 8 KHz Switch Reference 19 and the 51.84 MHz Switch Clock 14. The Switch Clock 17 and the Switch Reference 19 are both supplied to a Read Address and Data Pointer generator 20 which provides Read Addresses for the data buffer 13 to generate an output data stream 21. The Read Data Pointer and the Switch Timing Pointer are compared by a comparator and justification control circuit 22 and discrepancies between the two pointers are indicated to the Read Address and Data Pointer generator 20 which corrects the Switch Data Pointer value by justification.

By mathematically converting the Timing Switch Pointer to an equivalent Data Switch Pointer and comparing this equivalent with the actual Data Switch Pointer used to read the Data bytes from the Data buffer 13, decisions can be made as to whether the actual Data Switch Pointer is at the correct value or not. The actual Data Switch Pointer can be adjusted by performing either the appropriate positive or negative justification sequences, or for gross errors, such as at power on, the new Pointer Indication sequence. These sequences are already defined by the SDH recommendations.

Because the timing pointer is only giving an indication of the phase reference of the payload, the occasional missing timing pointer because of a negative justification or corruption of the pointer field is not critical. The mechanism of only normally permitting one (or two) increment (or decrement) at a time will allow a simple filtering method to ignore received timing pointers which have been corrupted.

For interworking, initialisation and recovery, larger changes to the pointer value will be permitted. When a new value is received on three successive occasions and the three values conform to the appropriate increment and decrement requirements then the new value will be accepted.

Using timing pointers it is possible to limit the phase distortion induced at a pointer processing node to 19.29 nanoseconds. When interworking with equipment that does not supply timing pointers, the pointer processing will cause significant phase distortion. However because a timing pointer will be transmitted onto the next pointer processing node, only 19.29 nanoseconds of phase distortion will occur at the next node provided the incoming timing pointer is used.

When timing pointers are used throughout the network the design of desynchronisers complying with the relevant CCITT recommendations becomes possible.

When timing pointers are not used, desynchronisers will produce more than the 1.5 UI permitted by G.823 and the 2 UI permitted by G.824.

Bit leaking is not an acceptable method because it introduces phase distortions and creates wander. When equipment does not receive timing pointers bit leaking will be used and the user of the equipment must accept the phase distortions that result.

We claim:

1. A method of pointer processing a digital TDM data stream at a node of a synchronous SDH transmission network so as to justify the data stream on transmission, the data stream having a specified line frequency, a line phase reference and being composed of frames, the data stream having associated with each frame a data pointer and a timing pointer, each frame containing a reference word, and the node of the transmission network having a node frequency and a node phase reference, the method comprising the steps of: storing the incoming data stream in a buffer store at the node; using the line phase reference of the incoming data stream to extract the data pointer from the data stream for each frame, said data pointer indicating the location of the reference word of that frame in the buffer store; extracting the timing pointer from the incoming data stream utilizing the line phase reference and a line clock having a frequency which is a multiple of the line phase reference; converting the timing pointer so extracted into a reference value by utilizing the node phase reference and a node clock; utilizing the reference value to generate a node timing pointer; comparing the node timing pointer with a read address and data pointer; and justifying read-out from the buffer store in accordance with the results of the comparison.

2. A method as claimed in claim 1, wherein the node clock has a frequency which is a multiple of the node frequency.

3. A method as claimed in claim 2, wherein the frequency relationship between the node clock frequency and the node phase reference is the same as that between the line clock frequency and the line phase reference.

4. Apparatus for pointer processing a digital TDM data stream at a node of a synchronous SDH transmission network, the data stream having a specified line phase reference and being composed of frames, the data stream having associated with each frame a data pointer and timing pointer, each frame containing a reference word, and the node of the transmission network having a node frequency and a node phase reference comprising: means for extracting the data pointer from the data stream for each frame; a buffer in which the data stream is stored with the data pointer indicating the location of each reference word; means for utilizing the node phase reference to generate a read address and a read data pointer so that the incoming data stream can be read from the buffer; means for extracting the timing pointer from the incoming data stream; a timing reference generator utilizing a line clock having a frequency which is a multiple of the line phase reference to generate a timing reference from the extracted timing pointer; a timing pointer generator utilizing a node clock for generating a read timing pointer; a comparator for comparing the read data pointer and the read timing pointer; and means for justifying an output data stream from the buffer in response to operation of said comparator.

* * * * *